United States Patent [19]

Shields

[11] 4,439,631
[45] Mar. 27, 1984

[54] METHOD AND MACHINE FOR PREPARING AN END PORTION OF A MULTI-CONDUCTOR FLAT CABLE FOR RECEIVING A CONNECTOR THEREON

[76] Inventor: Charles Shields, 655 Woodland Dr., Crystal Lake, Ill. 60014

[21] Appl. No.: 302,227

[22] Filed: Sep. 14, 1981

[51] Int. Cl.³ .................. H02G 15/02; H02G 1/14
[52] U.S. Cl. ............................ 174/74 R; 29/825; 29/564; 81/9.51
[58] Field of Search ............ 29/748, 749, 857, 860, 29/861, 753, 564, 825; 339/176 MF, 103 M; 81/9.51; 174/74 R

[56] References Cited

U.S. PATENT DOCUMENTS

| | | | |
|---|---|---|---|
| 3,385,140 | 5/1968 | Carpenter et al. | 81/9.51 |
| 3,691,509 | 9/1972 | Krol | 339/103 M X |
| 3,697,925 | 10/1972 | Henschen | 339/176 MF X |
| 3,904,261 | 9/1975 | Cooney | 339/176 MF X |
| 4,120,217 | 10/1978 | Rodd et al. | 81/9.51 |

Primary Examiner—Howard N. Goldberg
Assistant Examiner—Carl J. Arbes
Attorney, Agent, or Firm—Marvin N. Benn

[57] ABSTRACT

The machine is designed for the semi-manual preparation of a portion of an insulated and electrically shielded multi-conductor cable (12) for receiving a connector thereon. The machine (10) includes a holder (72) for receiving a portion (14) of the cable (12), a die assembly (96) for cutting off at least one side edge portion of the cable (12) to create at least one set back edge portion (20) in alignment with at least one conductor (15A) in the cable (12) adjacent the set back edge portion (20), a grinding wheel (52) for removing an insulating surface coating (30) of the cable (12) situated above an electrical shield (34) in the cable (12) and laterally of the set back edge portion (20) to expose a strip (32) of shield (34), and a scoring blade (64) for scoring the strip (32) of electrical shield (34) adjacent one edge (36) of the strip (32).

The method comprises the steps of: cutting off at least one side edge portion of the cable (12) to create the at least one set back edge portion (20) in a desired alignment with respect to at least one conductor (15A) in the cable (12) adjacent the set back edge portion (20); removing the insulating surface coating (30) to expose the strip (32) of electrical shield (34) extending laterally of the cable (12); scoring the strip (32) of electrical shield (34) adjacent the one edge (36) of the strip (32); and breaking the strip (32) of electrical shield (34) away from the cable (12) at the scoring line (36).

50 Claims, 12 Drawing Figures

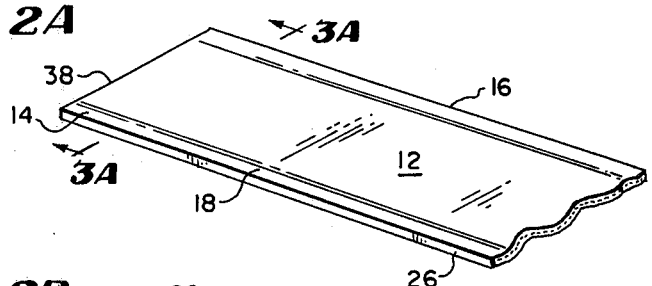
FIG. 2A
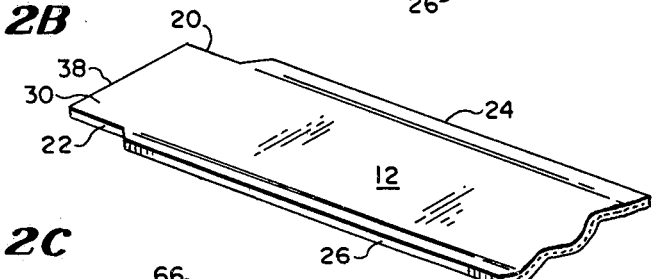
FIG. 2B
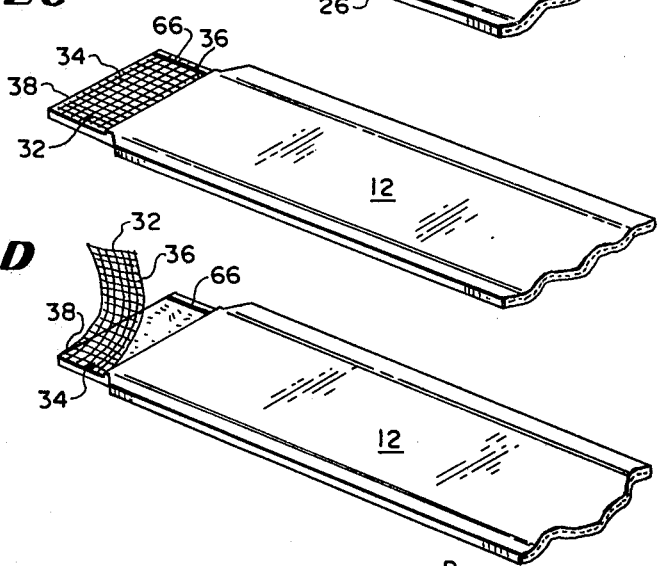
FIG. 2C
FIG. 2D
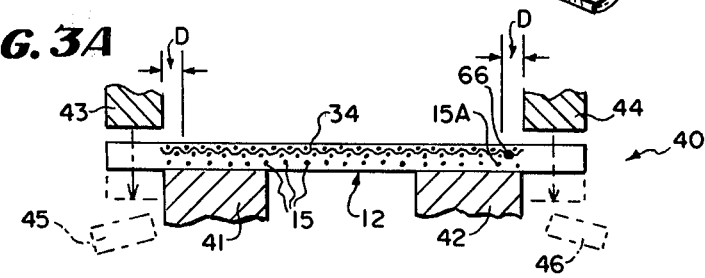
FIG. 3A
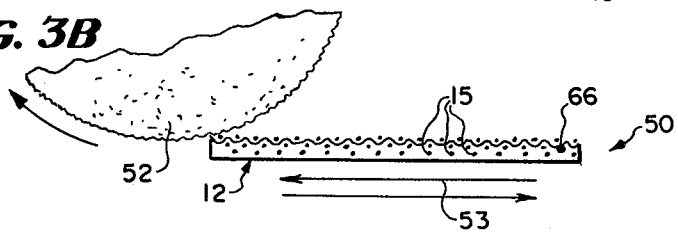
FIG. 3B
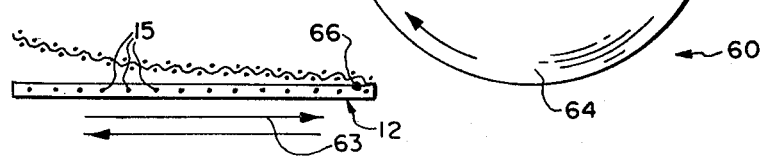
FIG. 3C

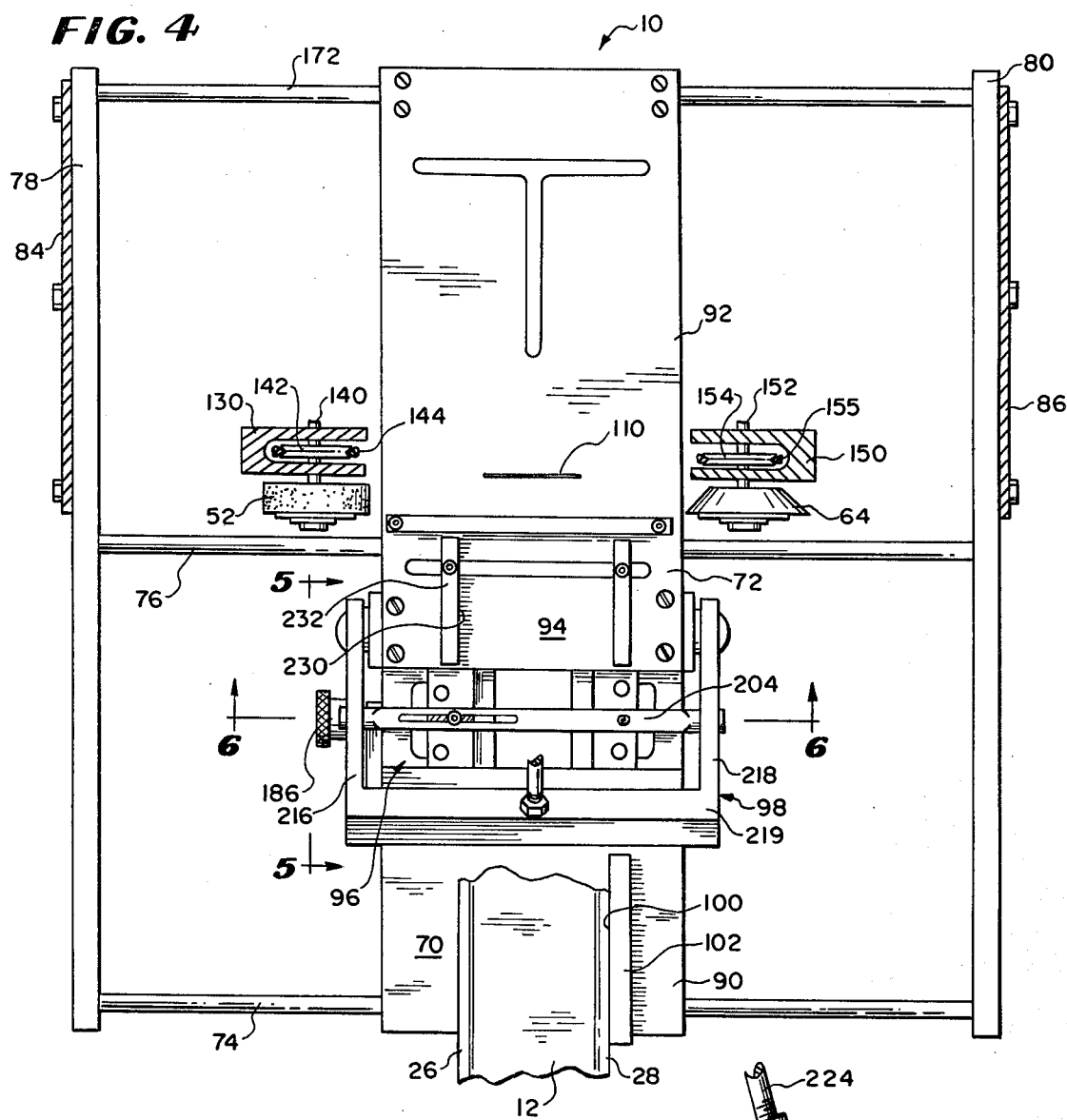
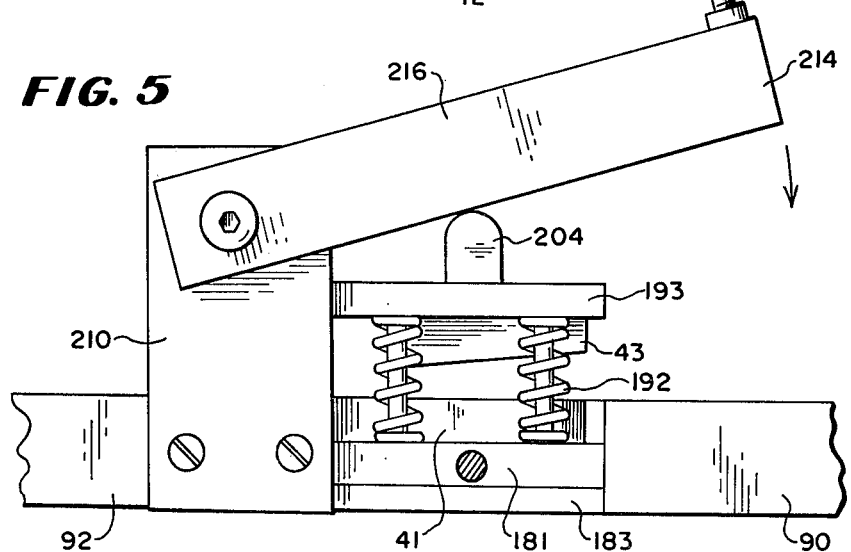

METHOD AND MACHINE FOR PREPARING AN END PORTION OF A MULTI-CONDUCTOR FLAT CABLE FOR RECEIVING A CONNECTOR THEREON

FIELD OF THE INVENTION

The invention relates to a machine and the method for using the machine for preparing the end portion of a multi-conductor flat cable for being inserted into a connector.

DESCRIPTION OF THE PRIOR ART

In the computer field, and particularly in the field of minicomputers and microcomputers, it is necessary to have multiple lines or busses connecting different elements. For example, it may be necessary to have a sixteen conductor cable providing a sixteen conductor bus for communicating between a central processing unit and a read only memory or a random access memory. Also, multiple conductor cables are utilized extensively in the tele-communications industry.

Typically, such a multiple conductor cable is a flat cable including a plurality (e.g., sixteen) of conductors in a parallel spaced array in the cable and embedded in or surrounded by flexible plastic insulating material. Also, to minimize the pickup of noise, an electrical shield (typically wide mesh or screen-type conductor) is placed over the insulated array of conductors and an insulating surface coating is applied over the electrical shield. Additionally, above the insulated plurality of conductors and is contact with the electrical shield there is positioned a system ground or system common conductor.

When it is desired to make electrical connections from the cable to an electrical connector, it is necessary to prepare an end portion of the cable for being received in the connector. The connector has an elongate slot therein and within the connector are a plurality of spaced apart contacter pins. These pins are spaced apart the same distance that the conductors in the cable are spaced from each other. Also, the first contacter pin is spaced a predetermined distance from one edge of the slot in the connector.

When the end of the cable is properly prepared, it is then inserted in the slot and an actuator is actuated to push the contacter pins through the cable and into contact with the conductors in the cable.

The cable typically has side marginal portions in which there are no conductors and the side marginal portions extend from the adjacent conductor in the cable a distance greater than the distance between the edge of the slot and the first contact pin adjacent thereto. Accordingly, in preparing the end portion of the cable, one must first cut a notch in the side marginal portion on each side of the cable to create a set back edge portion which is at a predetermined distance from the first adjacent conductor in the flat cable. Then, the insulating surface coating over the electrical shield must be removed and the strip of electrical shield exposed must be removed. Then, the end portion of the cable is ready to be received in the slot in the connector and the actuator actuated to move the pins into the cable and into contact with the conductors therein.

Heretofore, the end of the cable was prepared manually and this required careful notching of the margins of the cable, carefully removing the insulating surface coating and carefully removing the exposed strip of electrical shield without cutting into the cable or into the conductors embedded therein and also without shearing off the ground conductor which must be exposed for connection to the system ground. This is a tedious manual task and takes several minutes to perform. Also, it is subject to human error resulting in a large number of faultily prepared end portions which must be rejected since they do not permit a proper connection of the contact pins with the conductors in the cable.

As will be described in greater detail hereinafter, the machine of the present invention and the method for using same of the present invention enable one to quickly and accurately cut notches in the side margins of the cable, remove the insulating surface coating, and score the exposed strip of electrical shield for the manual removal thereof from the end portion of the flat cable.

SUMMARY OF THE INVENTION

According to the invention there is provided a method for preparing a portion of an insulated and electrically shielded multi-conductor element for receiving a connector thereon, the method comprising the steps of: cutting off at least one side edge portion of the element to create at least one set back edge portion in a desired alignment with respect to at least one conductor in the element adjacent the set back edge portion; removing an insulating surface coating of the element situated above the electrical shield and laterally of the set back edge portion to expose a strip of electrical shield extending laterally of the element; scoring the strip of electrical shield adjacent one edge of the strip; and breaking the strip of electrical shield away from the element at the score line.

Further, according to the invention there is provided a machine for preparing a portion of an insulated and electrically shielded multi-conductor element for receiving a connector thereon, the machine including: means for receiving a portion of the element; means for cutting off at least one side edge portion of the element to create at least one set back edge portion in alignment with at least one conductor in the element adjacent the set back edge portion; means for removing an insulating surface coating of the element situated above an electrical shield in the element and laterally of the set back edge portion to expose a strip of the electrical shield; and means for scoring the strip of electrical shield adjacent one edge of the strip.

Still further according to the invention, the method can be modified for removing an insulating surface coating of the element situated above the electrical shield to expose a strip of electrical shield extending laterally of the element followed by cutting off at least one side edge portion of the element adjacent the exposed strip of electrical shield to create at least one set back edge portion in a desired alignment with respect to at least one conductor in the element adjacent the set back edge portion.

Still further, the method of the invention can be modified such that the step of cutting off at least one side edge portion of the element is performed after the step of scoring the strip of electrical shield.

Finally, according to the invention the machine can be simplified to provide only means for receiving a portion of the element; means for removing an insulating surface coating of the element situated above an electrical shield in the element to expose a strip of the electrical shield and means for cutting off at least one side edge portion of the element adjacent the exposed strip of electrical shield to create at least one set back edge portion in alignment with at least one conductor in the element adjacent the set back edge portion.

BRIEF DESCRIPTION OF THE DRAWINGS

FIGS. 2A–2D show four stages in the preparation of the end of the flat multi-conductor cable as it is moved to different stations within the machine shown in FIG. 1 for preparing the end of the cable for receiving a connector thereon.

FIG. 3A shows the cutting of notches into the side margins of the flat multi-conductor cable at a cutting station in the machine and is taken along line 3A—3A of FIG. 2A.

FIG. 3B shows the grinding of an insulating surface coating off of the end of the cable at a grinding station in the machine to expose a strip of electrical shield.

FIG. 3C shows the scoring of the exposed strip of electrical shield at a scoring station in the machine and shows the strip pulled away from the end of the cable.

FIG. 4 is a top plan view of the machine shown in FIG. 1 with portions broken away to show various parts of the machine.

FIG. 5 is a fragmentary elevational view taken along line 5—5 of FIG. 4.

DESCRIPTION OF THE PREFERRED EMBODIMENT

Figure 1:
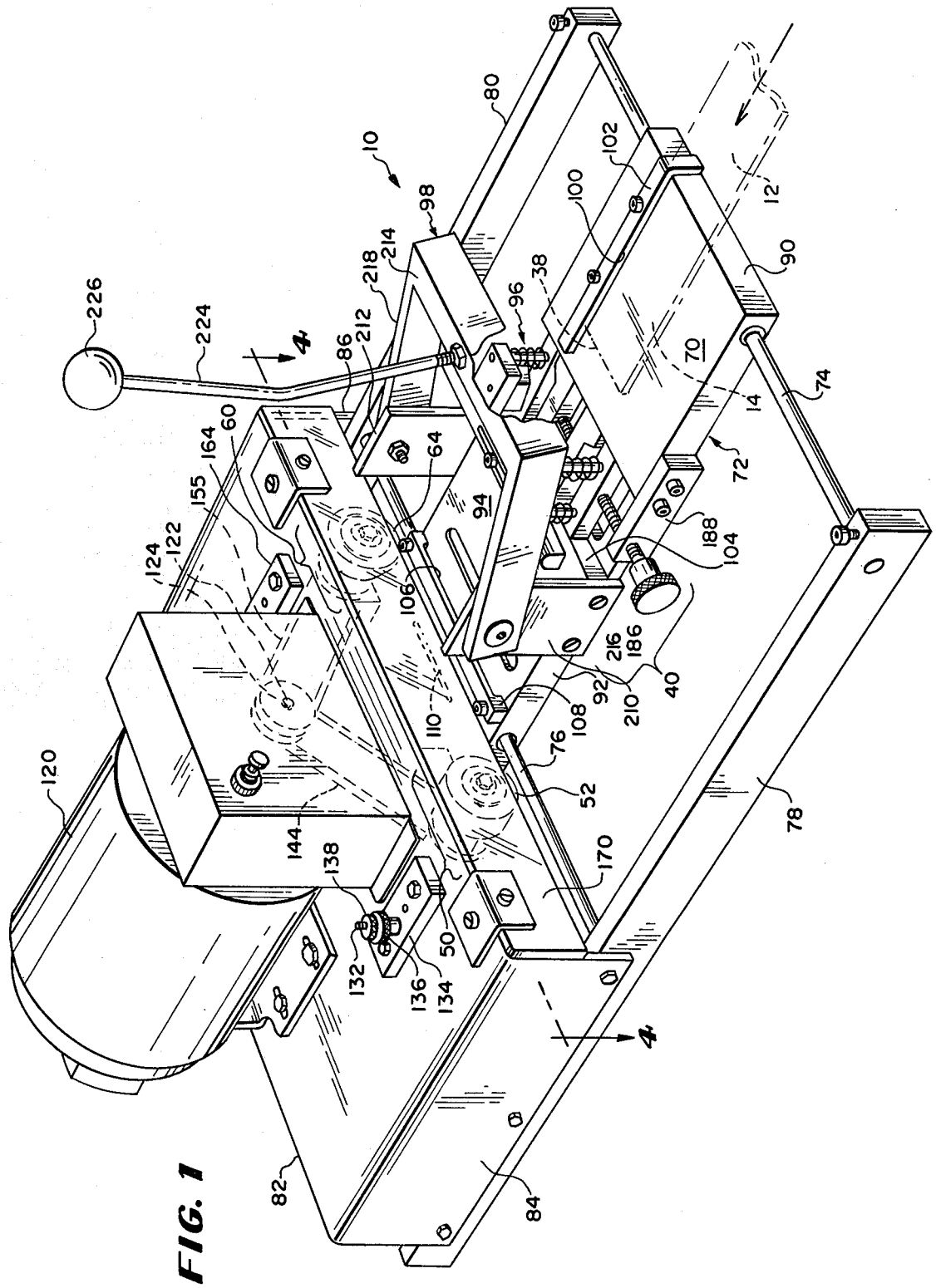
FIG. 1 is a perspective view of the machine of the present invention for preparing the end of a flat multi-conductor cable for receiving a connector thereon.

Referring now to the drawings in greater detail, there is illustrated in FIG. 1 a machine 10 constructed in accordance with the teachings of the present invention. As will be described in detail below, the machine 10 is particularly adapted for preparing the end of a flat multi-conductor element or cable 12 for receiving a connector thereon. With some modification, the machine 10 can be adapted also to prepare an intermediate portion of the flat multi-conductor cable 12 for receiving a connector thereon.

The cable 12 having an end portion 14 (FIG. 2A) to be prepared for the fitting of a connector thereon is illustrated in phantom in FIG. 1.

In FIG. 2A there is illustrated the end portion 14 of the cable 12 which is to be prepared for receiving a connector (not shown) thereon. The connector has a slot therein for receiving the end portion 14 after it is prepared and the cable 12 has an array of spaced apart parallel conductors 15 therein (FIGS. 3A–3C) situated between opposite side margins 16 and 18 of the flat cable 12.

Further, the connector has a plurality of pin-type contacters therein which, when the connector is placed on the end portion 14 after it is prepared, are caused to extend into the flat cable 12 and into conductive contact with the plurality of conductors 15 therein.

The width of the slot in the connector is less than the width of the flat cable 12. Thus, to prepare the end portion, one must first remove a portion of each margin 16 and 18 of the cable 12 at the end portion 14. One may refer to this as notching the side margins 16 and 18 of the cable 12 at the end portion 14 as shown in FIG. 2B. When this is done, opposite set back edge portions 20 and 22 are created which are set back laterally of the cable 12 from side edges 24 and 26 of the cable 12.

At least one set back side edge portion, e.g., set back edge portion 20, must be located a predetermined distance, D, from an adjacent conductor 15A (FIG. 3A) embedded in the cable 12. This distance, D, is equal to the distance from a side edge of the slot in the connector and the first pin adjacent that side edge which will be moved into conductive contact with the first conductor 15A.

Accordingly, it is important that proper alignment of the set back side edge portions 20 and 22 with respect to the side edges 24 and 26 be obtained when preparing the end portion 14 of the cable 12 being received in a connector so that edge portion 20 is the proper distance, D, from the adjacent conductor 15A, the distance, D, being equal to the distance from the side edge of the slot in the connector to the first contact pin therein.

Additionally, what is also important is to remove an insulating surface coating 30 from the edge portion 14 to expose a strip 32 of an electrical shield 34 in the flat cable 12 as shown in FIG. 2C. This is accomplished by removing, such as by grinding, the insulating surface coating 30 off of the end portion 14.

Then, the strip 32 must be removed and this is achieved by scoring the strip 32 along one edge 36 thereof which is spaced from an end edge 38 of the cable 12.

Once the strip 32 of electrical shield 34 is scored along the edge 36, it can then be peeled away from the flat cable 12 as shown in FIG. 2D. It is important to note that rather than cut all the way through the electrical shield 34, only a score is formed therein at the edge 36 to prevent inadvertent cutting into the insulation above the conductors in the cable 12.

The plurality of conductors 15 in the flat cable 12 are not visible in FIGS. 2A–2D but can be seen in the sections shown of the cable 12 in FIGS. 3A–3C.

To prepare the cable 12 to obtain an end portion 14 which has side marginal portions removed from each side thereof, the insulating coating 30 removed from above the electrical shield 34, and the strip 32 of electrical shield 34 scored and removed to obtain a finished end portion 14 adapted to receive a connector thereon as shown almost completed in FIGS. 2D or 3C, four steps or operations are performed on the cable 12 utilizing the machine 10 of the present invention. Three of these operations occur in the machine 10 at three stations in the machine 10.

The first station is a cutting station 40 and is shown in FIG. 3A. Here, the strip is moved into an aligned position over two lower dies 41 and 42 and then two upper dies 43 and 44 are moved downwardly to shear off side marginal portions 45 and 46 from the end portion 14 of the element 12. The upper and lower dies 43 and 41 constitute one pair of cutting dies and the upper and lower dies 44 and 42 constitute a second pair of cutting dies which will be described in greater detail in connection with the description of FIGS. 6 and 7.

As will be described in more detail in connection with the description of the machine 10 shown in FIGS. 1 and 4, flat cable 12 is manually moved from the cutting station 40 to a grinding station 50 shown in FIG. 3B. At the grinding station 50, there is positioned a grinding wheel 52 which is located at a height above a supporting surface (94) for the cable 12 which will cause the grinding wheel 52 to grind off the insulating surface coating 30 when the cable 12 is moved beneath the grinding wheel in the direction shown by the arrow 53.

After the insulating surface coating 30 has been removed from the end portion 14 of the strip 12 by moving the flat cable 12 laterally of the grinding wheel 52 and beneath the grinding wheel 52, the flat cable 12 is then moved manually to a scoring station 60 shown in FIG. 3C. As shown, the end portion 14 of the cable 12 is moved in another lateral direction indicated by arrow 63 and into engagement with a rotating scoring blade 64 which is positioned to score the strip 32 of electrical shield 34 at and along the edge 36. In this respect, it will be understood that the height of the scoring blade 64 above the supporting surface (94) for the end portion 14 of the cable 12 is such that the scoring blade 64 will only score the electrical shield 34 at the edge 36 when the flat cable 12 is moved therebeneath.

Also, by just scoring the strip 32, one avoids the possibility of cutting through a system ground on common conductor 66 which is situated in the cable 12 just below the electrical shield 34 and above the insulated parallel array of conductors 15.

The fourth step in preparing the end portion 14 of the cable 12 is a purely manual step where the strip 32 is folded back and fourth against the score line of edge 36 and then pulled off as shown in FIG. 2D. Then the end portion 14 is fully prepared for receiving a connector thereon.

As heretofore explained in the background of the invention, the steps of notching, or cutting, side marginal portions 45 and 46 away from end portion 14 of the flat cable 12, of removing the surface coating 30 and of scoring the strip 32 of electrical shield 34 along the edge 36 and then removing same, have heretofore been performed manually. These manual operations took an appreciable amount of time and were subject to much human error. With the machine 10 of the present invention, however, one can perform precise operations on the end portion 14 of the cable 12 to properly prepare it for being received in a connector in a very short time, and with a very low rate of rejects.

Referring again to FIG. 1, the first three operations described above are performed in the machine 10 and are initiated by first placing the flat cable 12 on an upper flat surface 70 of a holder 72 at one side of the machine 10. As shown, the holder 72 is slidably journalled on two rods 74 and 76 which in turn are mounted to and between two base frame members 78 and 80 of the machine 10. The holder 72 and slide rods 74 and 76 are located on the one side of the machine 10.

On the other side of the machine 10 secured to and between the base frame members 78 and 80 is a platform 82 which has depending flanges 84 and 86 which extend downwardly from the platform 82 for securement to the base frame members 78 and 80.

The holder 72 has a first plate portion 90 having the upper surface 70 thereon. This upper surface 70 is an outer (entry) surface 70 on which the cable 12 is first received. As shown, the plate 90 has a bore therethrough through which the rod 74 is received.

The holder 72 further includes another plate 92 having an upper surface 94 forming an inner surface 94 of the holder 72 as shown. The plate 92 has a bore therethrough through which the rod 76 is received.

Between the plates 90 and 92 is located the cutting station 40 which has a cutting die assembly 96 thereat including the two pairs of upper and lower dies 43, 41 and 44, 42 together with a mechanism 98 for moving the upper dies 43 and 41 past the lower dies 41 and 44 to shear off the side marginal portions 45 and 46 from the end portion 14 of the cable 12 as will be described in further detail in connection with the description of FIGS. 5, 6 and 7.

As shown in FIG. 1, in using the machine 10 the flat cable 12 is first placed on the outer upper surface 70 of the plate 90 and adjacent an adjustably positionable abutment gauge surface 100 on one side of a bar 102 which is releasably secured to the upper surface 70 of the plate 90. This abutment gauge surface 100 establishes the depth of the notch that is cut into the side margin 16 by the cutting dies 44 and 42 at the cutting station 40. In this respect, the distance from the shearing edges of the cutting dies 44 and 42 relative to the abutment gauge surface 100 is set to provide the distance, D, shown in FIG. 3A.

It will be appreciated that the position of the abutment gauge surface 100 is first set for the particular type of flat cable 12 that is to be prepared. Then the flat cable 12 is slid along the abutment surface 100 until the end edge 38 of the cable is in alignment with an edge 104 of the plate 92. At that point, the upper dies 43 and 44 are moved downwardly past the dies 41 and 42 at the cutting station 40 to create the notches in the marginal portions 24 and 26 of the cable 12 to form the set back edge portions 20 and 22.

Then, the flat cable 12 is moved onto the surface 94 and through a slot 106 formed beneath a retaining bar 108 which is releasably secured to the upper surface 94 of the plate 92. The retaining bar 108 serves to hold the portion of the flat cable 12 adjacent the end portion 14 to be prepared down flat against the planar surface 94. The cable 12 is pushed through the slot 106 until the end edge 38 thereof engages a raised edge 110 on the surface 94 which forms a stop for limiting movement of the flat cable 12.

When the flat cable 12 is now in this position with the end portion 14 thereof located between the retaining bar 108 and the stop 110, the holder 72 can be moved laterally on the bars 74 and 76 to either the grinding station 50 or the scoring station 60. Typically, the holder 72 is first moved to the grinding station 50 where the end portion 14 is moved under the grinding wheel 52 (FIGS. 1 and 3B) to grind off the insulating surface coating 30. Then, the holder 72 with the flat cable 12 therein is moved laterally in the other direction under the scoring blade 64 to score the strip 32 of electrical shield 34 at the edge 36 thereof.

After the grinding of the insulating surface coating 30 off of the end portion 14 and the scoring of the strip 32 of electrical shield 34, the holder 72 is moved back to the position shown in FIG. 1 and the flat cable 12 is removed. Then, an operator will fold the strip 32 back and forth along the score line 36 and then peel it away from the end portion 14 as shown in FIG. 2D.

Referring to FIGS. 1 and 4, it is apparent that on the platform 82 is mounted an electric motor 120 having an output shaft 122 mounting a double pulley 124.

The motor 120 is utilized for driving or rotating the stationarily mounted rotatable grinding wheel 52 at the grinding station 50 and the stationarily mounted rotatable scoring blade 64 mounted at the scoring station 60.

At the grinding station 50, a member or block 130 (FIG. 4) is suspended from the platform 82 by a stud or bolt 132 which is received through a plate 134 secured to the platform 82 and through a knob 136. A locking nut 138 is received on the bolt 132 above the knob 136.

The distance by which the block 130 depends from the platform 82 can be adjusted by rotating the knob 136. Then, when the desired position is set, the locking nut 138 is rotated against the knob 136 to releasably lock the block 130 in place.

As best shown in FIG. 4, the block 130 is bifurcated and has a stub shaft 140 extending through the bifurcation and journalled in each leg of the bifurcation. Within the bifurcation is situated a pulley 142 on the stub shaft 140. The outer end of the stub shaft 140 has the grinding wheel 52 mounted thereon.

As best shown in FIG. 1, a belt 144 extends from the pulley 124 over the pulley 142 journalled in the block 130.

With this arrangement, the position of the block 130 can be adjusted as desired and locked in place and yet at the same time the grinding wheel 52 journalled in the block 130 can be continuously rotated by the motor 120.

In like manner at the scoring station 60, there is a block 150 which is suspended from the platform 82. The block or member 150 is also bifurcated and has a stub shaft 152 extending across the bifurcation and is journalled in each leg of the bifurcation. On the stub shaft 152 within the bifurcation is a pulley 154 which is coupled by a belt 155 to the pulley 124 and on an end thereof, the scoring blade.

Although hidden from view in FIG. 1, it will be understood that the block 150 is releasably fixed in place by a stud or bolt, a threaded knob and a lock nut similar to the stud or bolt 132, the knob 136 and the lock nut 138. In other words, the assembly for suspending the block 150 from the platform 82 is substantially identical to the assembly for suspending the block 130 from the platform 82. In this respect, there is shown in FIG. 1 a plate 164 of this assembly which is identical to the plate 134 for the assembly for suspending the block 130 from the platform 82.

It will be apparent from FIG. 1 that a wide slot is cut through the platform 82 to permit the belts 144 and 155 to extend from the pulley 124 to the pulleys 142 and 154 respectively. Also, as shown in FIG. 1, a housing is mounted about this slot to prevent an operator of the machine 10 from entangling anything with the moving belts 144 and 155.

Also it is apparent from FIG. 1 that a transparent cover plate 170 is suspended from the platform 82 in the middle of the machine 10 and in front of the grinding station 50 and the scoring station 60. This cover plate 170 permits an operator to observe the grinding and scoring operations through the plate 170.

As shown in FIG. 4, the plate 92 can, if desired, extend all the way across the machine 10 beneath the platform 82 and can be slidably supported on a rod 172 at the other end of the machine extending between the base frame members 78 and 80.

Figure 6:
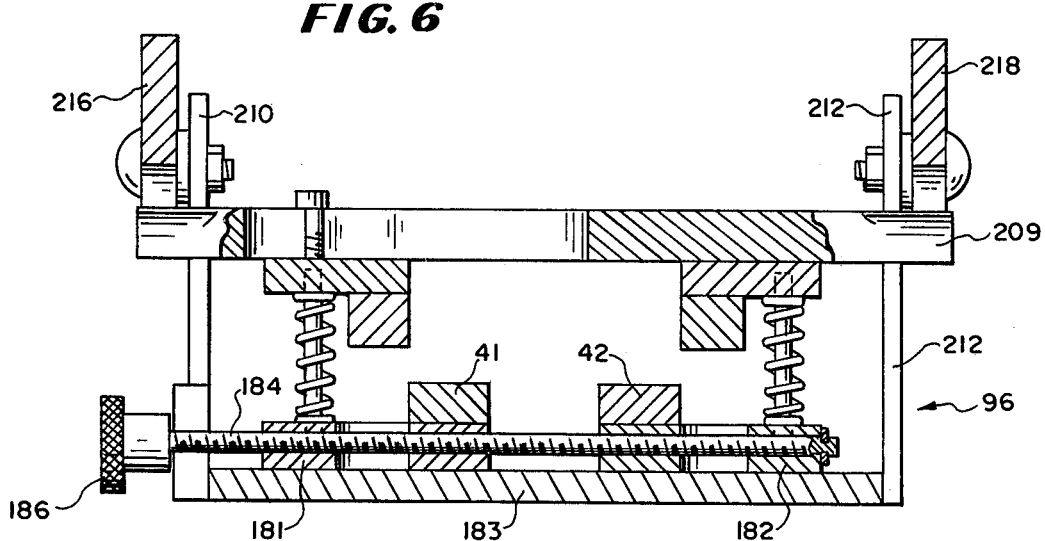
FIG. 6 is a sectional elevational view taken along line 6—6 of FIG. 4.
Figure 7:
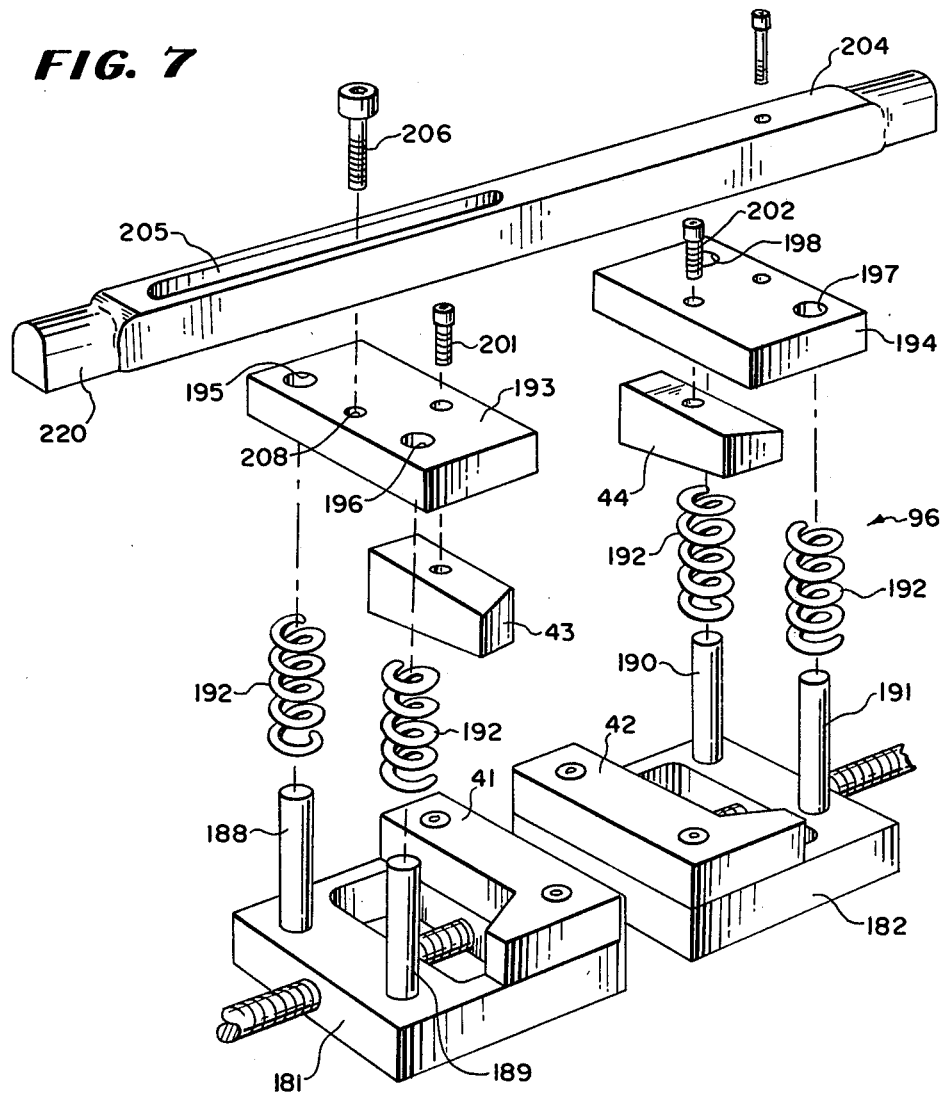
FIG. 7 is an exploded perspective view of the cutting die assembly at the cutting station in the machine shown in FIG. 1.

Referring now to FIGS. 6 and 7, it will be apparent that the lower die members 41 and 42 are each fixed to a base member 181 and 182 which are slidably positioned on a base plate 183 extending between the plates 90 and 92 adjacent the bottom edge thereof. A threaded rod 184 is threadedly received through a bore in the base members 181 and 182. The threaded rod 184 extends to a knob 186 through a mounting bracket 188 (FIG. 1) extending from said fixed to a side of the plate 90. It will be apparent that the position of the dies 41 and 42 relative to each other and relative to the abutment gauge surface 100 can be easily adjusted by rotation of the knob 186.

Also, it is apparent from FIG. 7 that by reason of the dies being fixed by Allen screws to the base members 181 and 182, the dies can be easily replaced or changed.

The cutting die assembly 96 also includes two pins 188 and 189 extending upwardly from the base member 181 and two pins 190 and 191 which extend upwardly from the base member 182. On these pins 190, 191 are received springs 192. A first die mounting block 193 having the upper die 43 fixed to and suspended therefrom is adapted to be received over the pins 188 and 189 and a second die mounting block 194 having the die 44 suspended therefrom and fixed thereto is received over the pins 190 and 191. For this purpose the block 193 has two bores 195 and 196 which are of larger diameter than the pins 188 and 189. Likewise, the die mounting block 194 has two bores 197 and 198 which are received over the pins 190 and 191.

The die 43 is fixed to the die mounting block 193 by an Allen screw 201 and the die 44 is secured to the die mounting block 194 by an Allen screw 202.

Positioned above the die mounting blocks 193 and 194 is a bar 204 with a slot 205 therein through which a screw 206 is received for being threadedly received in a bore 208 in the die mounting block 193.

With this assembly, it will be apparent that when the bar 204 is pushed downwardly against blocks 193 and 194, the upper dies 43 and 44 are caused to move downwardly and past the dies 41 and 42 to shear material situated between the dies. Also, since the die mounting blocks 193 and 194 are slidably received on the pins 188-191 fixed to the base members 181 and 182, movement of the base members 181 and 182 relative to each other upon rotating the knob 186 will also cause joint movement therewith of the blocks 193 and 194 and the dies 43 and 44 depending therefrom so that the dies 43 and 44 will always be in alignment with the dies 41 and 42.

To provide a mechanical advantage and means for moving the bar 204 downwardly, the mechanism 98 is provided. This mechanism 98 consists of two upright arms 210 and 212 which are fixed to and extend upwardly from side edges of the plate 92 as shown in FIG. 1. A U shaped member 214 is pivotally mounted at each end to one of the arms 210 or 212 with each leg 216 and 218 of the U shaped member 214 passing over one rounded edge 220 or 222 of the bar 204. Rod 224 is fixed to and extends upwardly from the U shaped member 214 and has a ball 226 at the free end thereof which forms a handle. With this arrangement, an operator will grasp the ball 226 and force the U shaped member 214 downwardly such that the legs 216 and 218 thereof engage the rounded ends 220 and 222 of the bar 204 and force the upper cutting dies 43 and 44 downwardly past the lower cutting dies 41 and 42 compressing the springs 192.

As shown in FIG. 4, a second abutment gauge surface 230 defined by the side of a bar 232 adjustably fixed to the top surface 94 of the plate 92 can be provided such that when the flat multi-conductor cable 12 is inserted into the machine 10 and past the cutting station 40, the opposite edge 18 of the cable will slide past the abutment gauge surface 230 and be aligned therewith.

The two abutment gauge surfaces 100 and 230 will assist in maintaining the cable 12 stationary on the holder 72 (prevent skewing thereof) when the holder 72 is moved laterally to the grinding station 50 or scoring station 60.

From the foregoing description it will be apparent that in practicing the method for preparing an end portion 14 of a flat multi-conductor cable 12 using the machine 10, an operator will first place the cable 12 on the surface 70 of the plate 90 and adjacent the abutment gauge surface 100. Then he will move the conductor to the desired aligned position at the cutting station 40 and grasp the handle 26 to move the cutting dies 41 and 43 downwardly to notch the side marginal portions 24 and 26 of the cable 12 to obtain the set back edge portions 20 and 22. Then the operator will move the cable 12 forward past the abutment gauge surface 232 and through the slot 106 under the bar 108 and against the stop 110. At this time, of course, the motor had already been turned on such that the grinding wheel 52 and scoring blade 64 are rotating. Then the operator will move the holder 72 with the cable 12 thereon on the rods 74, 76 and 172 to move the end portion 14 of the cable under the grinding wheel 52 to grind off the insulating surface coating 30.

Then the operator will move the holder 72 laterally in the other direction past the scoring station 60 such that the scoring blade 64 scores the strip 32 of electrical shield 34 at the edge 36 thereof. After the scoring has been accomplished, the operator will move the holder 72 back to the middle of the machine 100 and withdraw the cable 12 followed by manually bending and then peeling away the strip 32 of electrical shield 34. Then the operator is ready to prepare the end portion 14 of another piece of cable 12. These steps take only a few seconds each to accomplish and they are accomplished with such precision that there are essentially no improperly prepared end portions 14 and thus hardly any rejects.

From the foregoing description it will be apparent that the machine 10 and method for using same of the present invention provide a number of advantages, some of which have been described above and others of which are inherent in the invention. Also, the machine 10 has a number of advantageous features.

Further it will be apparent to those skilled in the art that modifications can be made to the machine 10 and the method of using same without departing from the teachings of the invention. For example, the machine 10 can be constructed without the scoring station 60. The machine 10 would then be constructed without the block 150, the scoring blade 64 or the belt 155. With the machine constructed in this manner, only the steps of cutting or notching at the cutting station 40 and the step of removing the insulating surface coating 30 by grinding at the grinding station 50 are performed on the end portion 14 of the cable 12.

Also these steps can be performed in reverse order. In this respect, the insulating surface coating 30 can first be ground off at the grinding station 50 followed by the notching or cutting of the side marginal portions 24 and 26 of the cable 12 to provide the set back edge portions 20 and 22.

Also in practicing the method, the steps described above could be performed in different order. In this respect, the insulating surface coating 30 can be first removed from the end portion 14 of the cable 12 at the grinding station 50 followed by the scoring of the strip 32 of electrical shield 34 at the edge 36 at the scoring station 60 followed by the cutting or notching of the side marginal portions 24 and 26. In practicing the method in this sequence, the further step of breaking the strip 32 of electrical shield 34 away from the end portion 14 can be performed before or after the cutting or notching step at the cutting station 40.

Still further, the stop 110 can be removed to permit an operator to sequentially remove lateral strips of insulating surface coating 30 to provide an elongate end portion greater than the width of the grinding wheel 52 which has the insulating surface coating 30 removed from above the electrical shield 34. Also, when preparing such an elongate end portion of the cable 12, sequential cutting operations are performed on the cable 12 at the cutting station 40 to provide an elongate set back edge portion 20 and/or 22.

Also as noted previously, the machine 10 can be adapted to prepare an intermediate portion of the cable 12 rather than an end portion 14 of the cable 12. Accordingly, the scope of the invention is only to be limited as necessitated by the accompanying claims.

I claim:

1. A method of preparing a portion of an insulated and electrically shielded multiconductor element for receiving a connector thereon, said method comprising the steps of:

advancing a portion of the element to a cutting station;

cutting notches in the side edges of a portion of the element;

advancing a portion notched at the cutting station to a grinding station;

grinding the portion of the element to remove an insulating surface coating of the element;

moving the portion to a scoring station;

scoring a score line in an exposed portion of an electric shield along the width thereof, said step of scoring providing only a partial cut of the electric shield so that portions of the electric shield on either side of the score line are still attached to each other.

2. The method according to claim 1, further comprising the step of breaking away a strip of electric shield from the remainder of the electric shield along the score line formed in said step of scoring.

3. The method according to claim 2, wherein said step of breaking away is done manually.

4. A notched multiconductor element having a portion thereof that is stripped of an outer covering of insulating surface coating and of an electric shield positioned beneath the insulating surface coating made in accordance with the method steps of claim 1.

5. A method of preparing a portion of an insulated and electrically shielded multiconductor element for receiving a connector thereon, said method comprising the steps of:

grinding in a lateral, width-wise direction a given portion of an insulating surface coating of the element situated above an electric shield of the element to expose a strip of electric shield extending laterally along the width of the element; and scoring the exposed strip of electric shield in the lateral width-wise direction along at least one portion thereof from one edge surface of the exposed strip of electric shield to the other edge surface thereof such that the scored exposed strip is still fixedly connected to the rest of the electric shield along at least one line in the width-wise lateral direction; whereby a portion of the multiconductor element is prepared for subsequent use.

6. The method according to claim 5, wherein said step of scoring comprises scoring two score lines in a strip of electric shield with the score lines being separated by a desired distance along the length of the electric shield, whereby an intermediate portion of the multiconductor element may be prepared for receiving a connector thereon.

7. The method according to claim 5, further comprising the step of cutting notches in the side edge portions of the element to form set back side edge portions.

8. The method according to claim 7, wherein said step of cutting is performed prior to said steps of grinding and scoring.

9. The method according to claim 7, wherein said step of cutting is performed after at least one of the steps of grinding and scoring.

10. A notched multiconductor element having a portion thereof that is stripped of an outer covering of insulating surface coating and of an electric shield positioned beneath the insulating surface coating in accordance with the method steps of claim 7.

11. A method of preparing a portion of an insulated and electrically shielded multiconductor element for receiving a connector thereon, said method comprising the steps of:

removing a given portion of an insulating surface coating of the element situated above an electric shield of the element to expose a strip of electric shield extending laterally along the width of the element; and scoring the strip of electric shield in the lateral, width-wise direction along at least one portion thereof from one edge surface of the electric shield to the other edge surface of the electric shield such that the entire width of electric shield is scored along at least one line in the lateral width-wise direction so that the shield strip is still fixedly connected to the rest of the shield, whereby a portion of the multiconductor element is prepared for reception of a connector thereon.

12. The method according to claim 11, wherein said step of removing a given portion of an insulating surface coating is carried out prior to said step of scoring the strip of electric shield.

13. The method according to claim 11, wherein said step of removing a given portion of an insulating surface coating comprises grinding off the insulating surface coating until the strip of electric shield is exposed.

14. The method according to claim 11, wherein said step of scoring a strip of electric shield is carried out prior to said step of removing a given portion of an insulating surface coating.

15. The method according to claim 14, wherein said step of removing a given portion of an insulating surface coating comprises grinding off the insulating surface coating until the strip of electric shield scored during said step of scoring the strip is exposed.

16. The method according to claim 11, further comprising the step of cutting off at least one side edge portion of the element to create at least one set back edge portion in a desired alignment with respect to at least one conductor in the element adjacent the set back edge portion, said step of cutting off comprising cutting off the given portion of the insulating surface coating and the strip of electric shield at at least one side edge margin thereof of each.

17. The method according to claim 16, wherein said step of cutting off at least one side edge portion of the element comprises cutting off a portion of the length of each of the insulating surface coating and electric shield approximately equal to at least the length of the strip of electric shield exposed during said step of removing a given portion of an insulating surface coating, the length of the strip of electric shield extending along the length of the electric shield in a direction taken transverse to the lateral, width-wise direction of the element.

18. The method according to claim 16, wherein said step of cutting off at least one side edge portion of the element is carried out prior to said step of removing a given portion of an insulating surface coating and said step of scoring a strip of electric shield.

19. The method according to claim 16, wherein said step of cutting off at least one side edge portion of the element is carried out subsequent to at least one of said step of removing a given portion of an insulating surface coating and said step of scoring the strip of electric shield.

20. The method according to claim 11, wherein said step of removing a given portion of an insulating surface coating is performed at a special location different from a spacial location where said step of scoring a strip of electric shield is performed.

21. The method according to claim 20, further comprising translating the element at the portion thereof which is to be scored between said step of removing a given portion of an insulating surface coating and said step of scoring a strip of electric shield, so that the portion of the element to be prepared for receiving a connector thereon is alternatively and selectively positioned at the locations where said steps of scoring and removing are performed.

22. The method according to claim 16, wherein said step of cutting off at least one side edge portion of the element is performed at a spacial location different from spacial locations where said steps of removing an insulating surface coating and scoring a strip of electric shield are performed.

23. The method according to claim 22, further comprising translating the element at the portion thereof which is to be prepared between said step of cutting off at least one side edge portion of the element and each of said steps of removing an insulating surface coating and scoring a strip of electric shield, so that the portion of the element to be prepared for receiving a connector thereon is alternatively and selectively positioned at locations where said steps are carried out.

24. The method according to claim 23, wherein said step of translating the element at the portion thereof which is to be prepared comprises advancing the element until a portion of the cable to be prepared is adjacent the location where said step of cutting off is to be performed, said step of advancing the element comprising advancing the element in a direction parallel with the length of the element transverse to the lateral width-wise direction of the element.

25. The method according to claim 24, wherein said step of translating comprises moving the element from the location where said step of cutting off is performed to a location where one of said step of removing an insulating surface coating and said step of scoring a strip of electric shield is performed, said step of moving comprising moving the element in the same direction as said step of advancing the element.

26. The method according to claim 25, wherein each location where each of said steps of removing a given portion of an insulating surface coating and scoring a strip of electrical shield is performed at a separate spacial location; and said step of translating further comprising conveying the element at the portion thereof which is to be prepared to receive a connector in the lateral, width-wise direction transverse to the direction in which said step of advancing is carried out.

27. The method according to claim 11, further comprising advancing the element in a direction along the length thereof transverse to the lateral, width-wise direction; and repeating said steps of removing a given portion of an insulating surface coating and scoring a strip of electric shield at least one more time, so that the size of the portion of the element prepared for receiving a connector is enlarged.

28. The method according to claim 27, further comprising the step of cutting off at least one side edge portion of the element to create at least one set back edge portion in a desired alignment with respect to at least one conductor in the element adjacent the set back edge portion, and repeating said step of cutting off a plurality of times so that the size of the portion of the element prepared for receiving a connector is enlarged.

29. The method according to claim 11, further comprising the step of breaking the strip of the electric shield away from the element, along at least one score line formed during said step of scoring.

30. The method according to claim 11, further comprising the step of advancing the element along its length-wise direction transverse to the width-wise direction after said step of scoring a strip of electric shield; and repeating said step of scoring an electric shield along another portion of the electric shield, so that the electric shield may be broken away from the element along the two score lines formed, whereby an intermediate portion of the element may be prepared for receiving a connector thereon.

31. A machine for preparing a portion of an insulated and electrically shielded multiconductor element for receiving a connector thereon, comprising, in combination:
a main frame;
means for positioning a portion of the element thereon which portion contains that part of the element to be prepared for reception of a connector thereto, said means for positioning being mounted to a front section of said main frame;
means for cutting off at least one side edge portion of the element at that part which is to be prepared to receive a connector to form at least one set back edge portion in alignment with at least one conductor in the element adjacent the set back edge portion, said means for cutting off being fixedly attached to a portion of said means for positioning a portion of the element, so that that part of the element to be prepared for reception of a connector may be positioned at said means for cutting off at least one side edge portion;
means for grinding an insulating surface coating of the element situated above an electric shield in the element to remove the insulating surface coating along that portion of the element to be prepared for reception of a connector, said means for grinding being mounted to a rear section of said main frame, so that that part of the element to be prepared may be situated at said means for grinding;
means for scoring a lateral edge of the electric shield, said means for scoring forming a score line in the electric shield such that the scored portion of the electric shield remains fixedly connected to the remainder of the electric shield along the length of the score line, said means for scoring also being mounted to said main frame, so that that part of the element to be prepared may be positioned thereat by said means for positioning; and
means for movably mounting said means for positioning a portion of the element for translation between said means for grinding and said means for scoring to thereby perform the necessary operations on the portion of the element to receive a connector thereon; said means for movably mounting connecting said means for positioning to the front section of said main frame for relative movement thereto.

32. The macine according to claim 31, wherein said means for movably mounting allows for translation in a direction transverse to the length of the element, each of said means for cutting, means for grinding, and means for scoring being located at distinct spacial locations on said main frame spaced from each other; and means on said main frame for connecting said means for movably mounting to said main frame.

33. The machine according to claim 32, wherein said means for positioning comprises a platform having a width along said direction, and a length parallel with the length of the element, said platform having a first opening formed through the width thereof along said direction; and said means for movably mounting having a first guide bar passing through said first opening formed in said platform, so that said means for positioning may be traversed in said direction along the length of said first guide bar to thereby position the part of the element to be prepared at one of the spacial locations of said main frame where said means for scoring and said means for grinding are located.

34. The machine according to claim 33, wherein said means for positioning further comprises a plate member fixedly joined to said platform, said plate member having a second opening formed through the width thereof along said direction; and said means for movably mounting further having a second guide bar for passing through said second opening; said second guide bar being spaced from said first guide bar in a direction along the length of the element from the front section of said main frame toward the rear section of said main frame.

35. The machine according to claim 34, wherein said means for cutting is mounted on said means for positioning between said platform and said plate member, so that said means for cutting, said platform, and said plate member all move together as a unit to position a part of the element at one of said means for scoring and said means for grinding.

36. The machine according to claim 35, wherein said means for positioning further comprises a base plate connecting said platform with said plate member, said means for cutting being mounted upon the upper surface of said base plate between said platform and said plate member.

37. A cutting apparatus for notching side edge portions of an insulated and electrically shielded multiconductor element to receive a connector thereon, comprising, in combination:

a main housing frame;

means for supporting a portion of the multiconductor element, said means for supporting being mounted to a portion of said main frame;

a pair of cutting implements spaced apart along a lateral direction, each of said pair of cutting implements comprising at least one cutting die;

plate means for mounting said pair of cutting implements to said means for supporting, so that a portion of the multiconductor element supported on said means for supporting may be located in alignment with said pair of cutting implements to notch the side edge portions thereof;

a first means and a second means for mounting a respective one of said pair of cutting implements to said plate member, at least one of said first means and said second means for mounting slidingly mounting a respective one of said pair of cutting implements to said plate member for relative movement of said pair of cutting implements;

distance varying means operatively connected to both of said first means and said second means for mounting a respective one of said pair of cutting implements to vary the relative distance between said pair of cutting implements in said lateral direction, said lateral direction being taken in the width-wise direction across the width of the multiconductor element to be prepared for receiving a connector;

and operating means operatively connected to both of said pair of cutting implements to actuate said cutting implements and notch the side edge portions of the multiconductor element; said means for supporting having an upper supporting surface upon which is placed the part of the element to be prepared, said upper supporting surface lying in a plane above said plate member so that the portion of the element to be prepared may be aligned with said pair of cutting implements so that said at least one cutting die of each of said pair of cutting implements lies above said plane when in its rest non-cutting position;

each of said first means and said second means mounting a respective one of said pair of cutting implements such that said at least one cutting die of each of said pair of cutting implements is slidable in a direction transverse to the width-wise direction and perpendicular to the direction parallel to the length of the element, said operating means forcing said at least one cutting die downwardly to cut through the side edge portions of the element when the portion of the element to be prepared is positioned in alignment with said pair of cutting implements.

38. The machine according to claim 36, wherein said (block) plate member includes a stop member which abuts against an edge of the portion of the element cut at said means for cutting, said stop member being positioned on said top surface of said (block) plate member in lateral width-wise alignment with said means for grinding and said means for scoring, so that the portion of the element to be prepared to receive a connector is aligned with said means for grinding and said means for scoring.

39. The machine according to claim 31, wherein said means for cutting comprises at least one cutting implement for cutting the portion of the element to form the set back edge portion; and means for adjusting the lateral position of said at least one cutting implement in the width-wise direction so that said cutting means may be adjusted to accommodate elements of differing widths.

40. The machine according to claim 39, wherein said means for adjusting comprises a threaded rod, and said cutting implement comprises at least one blade mounting means threadingly engaged with said threaded rod for movement therealong as said threaded rod is rotated.

41. The machine according to claim 40, wherein said cutting means comprises a pair of spaced-apart cutting implements, each said cutting implement comprising a first cutting die and a second cutting die, said second cutting die being mounted above said first cutting die for movement theretoward; means for mounting said second cutting die above said first cutting die for movement toward and away from said first cutting die, said means for mounting said second cutting die being mounted on said blade mounting means; said threaded rod mounting said blade mounting means of each of said pair of cutting implements, whereby upon rotation of said threaded rod, said pair of cutting implements are moved relative to each other along the longitudinal axis of said threaded rod.

42. The machine according to claim 41, wherein said means for mounting said second cutting die comprises at least one upstanding pin having a first lower end fixedly connected to said blade mounting means and a second upper end, at least one spring member telescopingly mounted over said at least one pin, and a plate having at least one hole formed therethrough to receive therein said second upper end of said at least one pin, said second cutting die being fixedly mounted to the underside of said plate and spaced laterally from said at least one pin, so that said second cutting die may be moved downwardly toward said first cutting die and restored to its normal, upward position by said at least one spring member.

43. The machine according to claim 42, wherein said means for cutting further comprises a guide bar positioned above said plates of said pair of cutting implements, said guide bar having an extended slot formed therethrough along a portion of its length, one of said plates of said pair of cutting implements being slidingly mounted in said slot of said guide bar for movement therein as said threaded rod is rotated.

44. The machine according to claim 43, wherein said means for cutting further comprises a lever arm pivotally connected to said means for positioning for movement toward and away from said guide bar, said lever arm being rotatable downwardly into engagement with said guide bar to force said guide bar downwardly against the action of said at least one spring member to thereby force said upper cutting dies toward said lower cutting dies to cut side edge portions of the element to form set back edge portions.

45. The machine according to claim 31, further comprising a housing mounting thereon said means for grinding and said means for scoring; said means for grinding comprising a grinding wheel, and adjustable mounting means to adjustably mount said grinding wheel so as to lower or raise said grinding wheel in a vertical direction, to thereby allow for the accommodation of different elements which have different thicknesses of insulating surface coating.

46. The machine according to claim 31, further comprising a housing mounting thereon said means for grinding and said means for scoring; said means for scoring comprising a rotatable scoring blade and adjustable mounting means to adjustably mount said rotatable scoring blade so as to lower or raise said scoring blade in a vertical direction, to thereby allow for accommodation of different elements which have different thicknesses of insulating surface coating.

47. The cutting apparatus according to claim 37, wherein each of said pair of cutting implements comprises a pair of oppositely disposed cutting dies, a first one of said pair of cutting dies being mounted above a second one of said pair of cutting dies, said first and said second cutting dies being aligned such that an edge surface of one lies in close proximity to the plane of an edge surface of the other, said edge surfaces of each lying in a vertical plane so that shearing forces are created upon actuation of said cutting implements, said second one of each of said pair of cutting dies being mounted directly above and in close proximity to the supper surface of said plate means so that said upper supporting surface of said means for supporting lies vertically in between said first and second cutting dies when the cutting dies are in their noncutting positions.

48. The cutting apparatus according to claim 47, wherein each of said first and second means for mounting a respective one of said pair of cutting implements comprises a block having at least one pin extending upwardly from the upper surface thereof, and a plate having at least one opening formed therethrough from its lower surface to its upper surface, said at least one pin extending through said at least one opening for relative movement therebetween; and at least one spring means telescopingly mounted over said at least one pin to bias said plate upwardly, said first cutting die of each of said pair of cutting implements being fixedly mounted to the underside of said plate and spaced laterally from said at least one pin in a direction toward the other one of said pair of cutting implements.

49. The cutting apparatus according to claim 48, wherein said operating means comprises a guide bar having a slotted opening extending therethrough along a portion of its length, one of said first cutting dies being slidably mounted in said slotted opening of said guide bar for movement therealong when said pair of cutting implements are moved relative to each other; and said distance varying means comprises a threaded rod threadingly mounted in said blocks of said pair of cutting implements so that upon rotation of said threaded rod, said pair of cutting implements are moved relative to each other.

50. The cutting apparatus according to claim 49, wherein said operating means further comprises a pivotal lever arm for contact with said guide bar to force said guide bar downwardly to thereby force said first ones of said pair of cutting dies toward said second ones of said pair of cutting dies to thereby cut that portion of the multiconductor element therebetween; and means for pivotally connecting said lever arm to said housing frame.

* * * * *